United States Patent [19]

Jeon et al.

[11] Patent Number: 5,940,480
[45] Date of Patent: Aug. 17, 1999

[54] METHOD OF EXTRACTING A CALL SET-UP FAILURE PROBABILITY AND A PREMATURE DISCONNECT PROBABILITY BY USING NETWORK DATA

[75] Inventors: Hyo Seop Jeon; Ho Suk Park; Jeong Tae Kim; Hyun Sik Lee; Ju Ki Park, all of Yusung-Ku, Rep. of Korea

[73] Assignee: Korea Telecommunication Authority, Seoul, Rep. of Korea

[21] Appl. No.: 08/991,142

[22] Filed: Dec. 16, 1997

[30] Foreign Application Priority Data

Dec. 18, 1996 [KR] Rep. of Korea ............... 96-67434

[51] Int. Cl.⁶ ............... H04M 15/00; H04J 1/16; G06F 15/16
[52] U.S. Cl. ............... 379/113; 379/133; 370/252; 395/200.57
[58] Field of Search ............... 379/111, 112, 379/113, 133, 137, 138, 139, 219, 221; 370/241, 242, 252; 395/200.57, 200.58, 200.59, 200.54

[56] References Cited

U.S. PATENT DOCUMENTS 5,189,667  2/1993  Esaki et al. .
5,434,848  7/1995  Chimento, Jr. et al. .
5,509,055  4/1996  Ehrlich et al. ............... 379/113
5,805,681  9/1998  Srikant et al. ............... 379/133
5,862,204  1/1999  Kim et al. ............... 379/134

*Primary Examiner*—Paul Loomis
*Attorney, Agent, or Firm*—Merchant & Gould, P.C.

[57] ABSTRACT

The present invention relates to a method of extracting a call set-up failure probability and a premature disconnect probability, which are factors for accessing the quality control of a data network. In accordance with the present invention the method comprises the steps of configuring a database for causes of premature disconnect and a configuration database which stores quality values which includes originating and destination numbers. Reading the corresponding billing record and verifying whether the record is normal, and if so, determining whether the origination/destination number of the billing record is the same as that stored in the configuration database. Updating a statistics database for each configuration database, each origination/destination call, each time and date when the numbers match, and then calculating the call set-up failure probability and premature disconnect probability for each configuration database, call and each time and date of the statistics database.

6 Claims, 2 Drawing Sheets

METHOD OF EXTRACTING A CALL SET-UP FAILURE PROBABILITY AND A PREMATURE DISCONNECT PROBABILITY BY USING NETWORK DATA

BACKGROUND OF THE INVENTION

1. Field of the Invention

The present invention relates to a method of extracting a call set-up failure probability and a premature disconnect probability, which are quality factors necessary for the quality control of a data communication network, by using network data. In particular, the present invention relates to a method of extracting a call set-up failure probability and a premature disconnect probability by using network data which extracts the call set-up failure probability and the premature disconnect probability by using various call information which are included in communication network data.

2. Description of the Related Art

With the proliferation of information communication services throughout the world, various data communication networks are being constructed and used. However, the problems encountered with these data communication networks are that even though users need high speed/high quality information communication services such as multimedia services, the environment for service provision including data communication networks fails to meet users' needs.

Therefore, the ITU-T has defined quality factors and quality values of data communication in order to provide better services of high quality in providing information communication services by using a data communication network, and has recommended it to be used by communication network operating bodies. Currently, some of the quality factors recommended by the ITU-T are used by almost all communication network operating bodies as their quality standard for a data communication network to control the quality of data communication.

Quality values recommended and used by the ITU-T and communication network operating bodies include the following: a call set-up delay, a call set-up error probability, a call set-up failure probability, a data packet transfer delay, a throughput capacity, a residual error probability, a premature disconnect probability, a premature disconnect stimulus probability, a reset probability, a reset stimulus probability, a clear indication delay, a call clear failure probability, a service availability, and a meantime between service outage.

A method of extracting the call set-up failure probability and the premature disconnect probability was presented by the ITU-T based on the system as shown in FIG. 1. The call set-up failure probability is a measure representing the quality of call set-up, and can be expressed by a rate of the number of call failures to the number of total call attempts. The premature disconnect probability is a measure representing the reliability of user information transmission, and can be expressed by the probability that a virtual call will experience a premature disconnect event for arbitrary intervals due to some causes arising from within the path constituted by the virtual call.

The system in FIG. 1 comprises a measurement control unit 1, a unit subjected to measurement 2, and a measuring device 3 which can monitor a protocol between the measurement control unit 1 and the unit subjected to measurement 2. In accordance with this system environment, a line, which can represent a data communication network, is selected. The measurement control unit 1, the unit subjected to measurement 2, and the measuring device 3 are installed at the center, on the line subjected to measurement, and on the network line, respectively. Then, a call set-up test and a premature disconnect test are performed. In this case, the restrictions at the time of extracting quality values are applied by excluding some conditions such as unavailable conditions.

However, the present packet-switched public data network (PSPDN) is spread over wide areas, and the number of lines is spread over several ten thousands. Therefore, the quality value calculated based on a selected portion of the total lines of the packet-switched public data network may not represent the quality of the whole packet-switched public data network. In the past, a data communication network supported a low speed model protocol, however, various speeds and protocols are currently supported by the communication network. For this reason, the measurement control unit 1, the unit subjected to measurement 2, and the measuring device 3 which can monitor a protocol between the measurement control unit 1 and the unit subjected to measurement 2 are needed to implement a system which can extract quality values of a communication network with the various speeds and protocols reflected. Also, there were many difficulties in implementing the system because it took a long period to extract quality values. For example, at least 200 call set-up tests, and call maintenance tests over 55 hours must be performed to calculate the quality standard value (type A for the domestic purpose) which is $5 \times 10^{-3}$ for a call set-up failure probability, and $5 \times 10^{-6}$ for a premature disconnect probability. This method estimates the quality value of the whole packet-switched public data network by using a few sample lines. Therefore, it is difficult to locate local lines whose quality have been degraded, to separate them from the network, and to analyze the cause of the degradation for improving the quality of a communication network. It is also difficult to reflect quality values into the design and engineering of the packet-switched public data network. Further, it is very costly to implement such a system.

Therefore, there have been problems in the art that the method of extracting quality values in accordance with the ITU-T is not adequate in view of the representativeness of quality values, the costs of implementing the system, and the efficiency of quality control; therefore the method is not adequate for use by communication network operating bodies.

SUMMARY OF THE INVENTION

It is therefore an object of the present invention to provide a method of extracting a call set-up failure probability and a premature disconnect probability by using network data which ensures the representativeness of the quality of a data communication network, is easy to implement and less costly, and makes the quality control easy in order to overcome the aforementioned problems in the art.

In accordance with the present invention, a method of extracting a call set-up failure probability and a premature disconnect probability by using network data is provided which makes the calculation of quality values possible by using billing data including a variety of call information which is created in a data communication network.

In accordance with one aspect of the present invention, a method of extracting a call set-up failure probability and a premature disconnect probability, which are quality factors necessary for the quality control of a data communication network, is provided which comprises the steps of constructing a configuration database from which quality values are extracted and a database storing a cause for a premature disconnect which identifies whether a cause for a premature disconnect is from the communication network or from a subscriber; reading the configuration database and the database storing a cause for a premature disconnect which have been constructed; reading a billing record from communication network data; verifying whether the read billing record is a normal record; returning back to said step of reading a billing record from communication network data if it is determined that the read billing record is not a normal record, and determining whether a call originating/ destination number of the billing record is equal to a number stored in the configuration database if it is determined that the read billing record is a normal record; returning back to said step of reading a billing record from communication network data if it is determined that a call originating/ destination number of the billing record is not equal to a number stored in the configuration database, and updating the information content of a statistics database previously constructed for each configuration database, each originating/destination call, and each time and date if it is determined that a call originating/destination number of the billing record is equal to a number stored in the configuration database; and calculating the call set-up failure probability and the premature disconnect probability for each configuration database, each originating/destination call, and each time and date from the information content of the statistics database.

In accordance with another aspect of the present invention, a method of extracting a call set-up failure probability and a premature disconnect probability which are quality factors necessary for the quality control of a data communication network is provided which comprises the steps of constructing a configuration database and a database storing a cause for a premature disconnect; reading the configuration database and the database storing a cause for a premature disconnect which have been constructed; reading a billing record from communication network data; verifying whether the read billing record is a normal record; determining whether a call originating/destination number of the billing record is equal to a number stored in the configuration database, if it is determined that the read billing record is a normal record; updating information content of a statistics database previously constructed for each configuration database, each originating/destination call, and each time and date, if it is determined that a call originating/destination number of the billing record is equal to a number stored in the configuration database; and calculating the call set-up failure probability and the premature disconnect probability from the information content of the statistics database.

BRIEF DESCRIPTION OF THE DRAWINGS

The present invention will become more apparent upon a detailed description of the preferred embodiments for carrying out the invention as rendered below. In the description to follow, references will be made to the accompanying drawings, where like reference numerals are used to identify like or similar elements in the various drawings and in which.

DETAILED DESCRIPTION OF THE INVENTION

Figure 1:
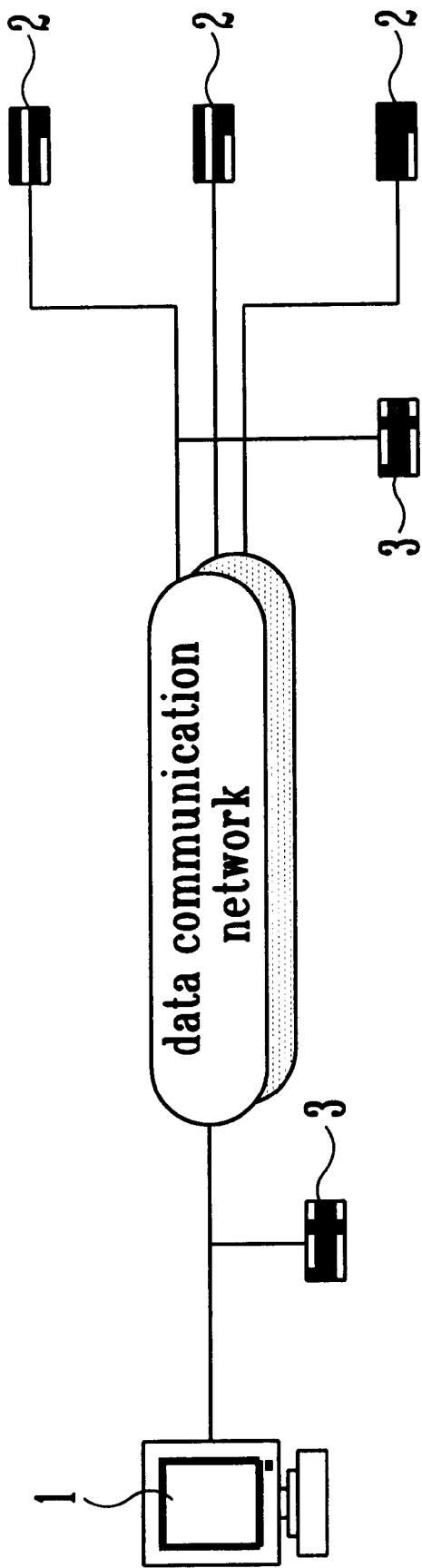
FIG. 1 is a diagram showing a system for extracting a call set-up failure probability and a premature disconnect probability in accordance with International Telecommunications Union (ITU-T) standards.
Figure 2:
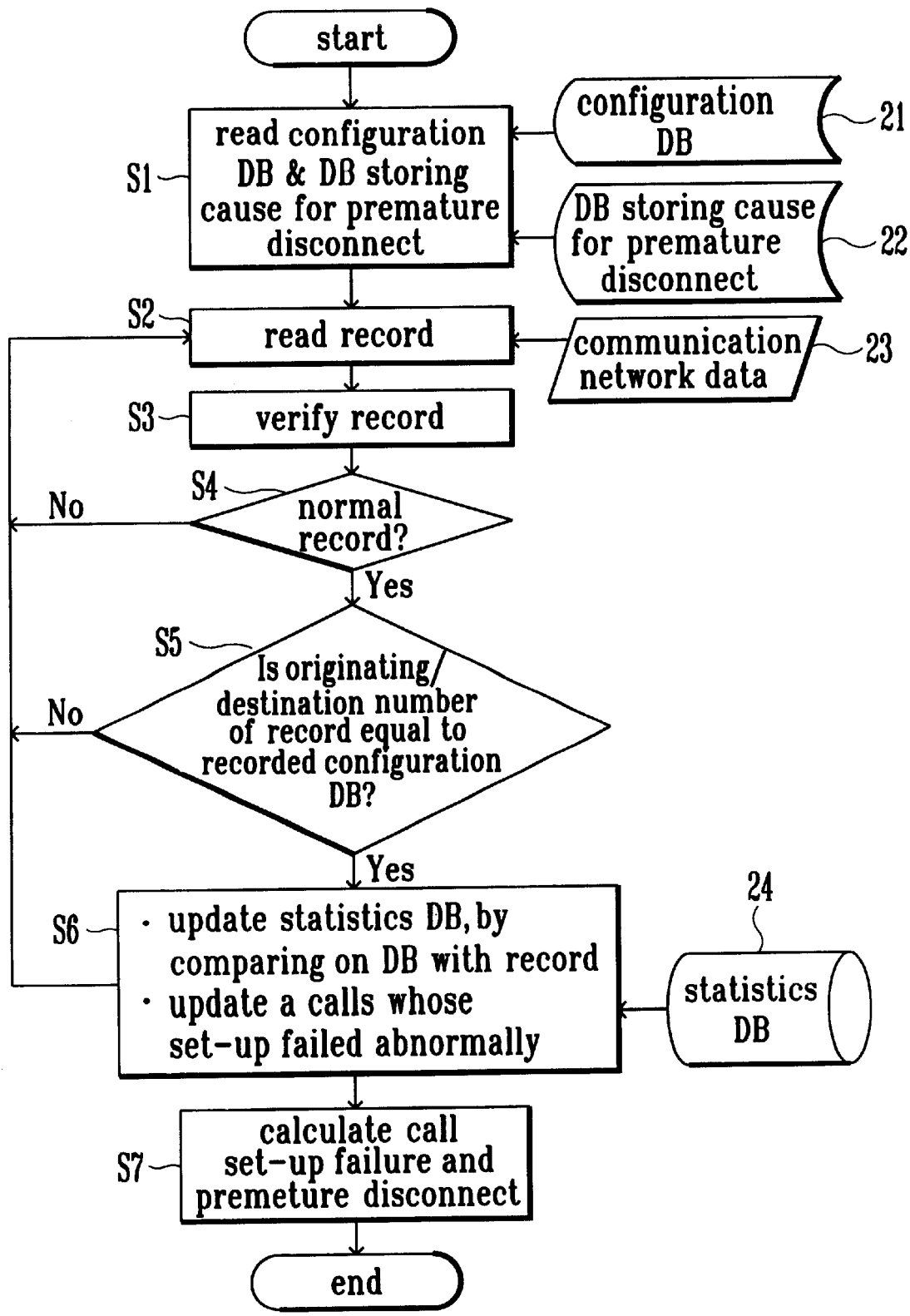
FIG. 2 is a flow chart implemented by a method of extracting a call set-up failure probability and a premature disconnect probability by using network data in accordance with the present invention.

FIG. 2 is a flow chart implemented by a method of extracting a call set-up failure probability and a premature disconnect probability by using network data in accordance with the present invention.

In the present invention, a configuration database 21 and a database storing a cause for a premature disconnect 22 are constructed to extract the call set-up failure probability and the premature disconnect probability. The configuration database 21 is constructed for the entire communication network, the lower part network, switching offices, lines, line groups, etc., for which quality values are extracted, by using a numbering system of the data communication network. In one embodiment of the invention, the HiNET-P uses a numbering system such as X.121 and E.164 which are used for the packet-switched public data network. Since the Data Network Identification Code (DNIC) is 4,500, the configuration database 21 for extracting the quality value for the entire HiNET-P may be constructed in the 4500-xxx-xxxx-xxx format (in this case, x is a wild character from 0 to 9). The configuration database 21 for the lower part network, switching offices, lines, and line groups is constructed by using a wild character or a unique number group since there is a Network User Address (NUA) complying with the X.121 numbering system for each line.

The database 22 storing a cause for a premature disconnect is a database by which a cause for a premature disconnect can be identified. For the HiNET-P, billing data includes codes representative of the causes for premature disconnects of calls, and thus the database 22 storing a cause for a premature disconnect can be constructed by classifying these codes. The cause from the network includes a temporary fault of a switch or a communication network, communication network routing data errors, communication network software faults, a busy state, and a service termination by a user. The database 22 storing a cause for a premature disconnect, which includes causes from the packet-switched public data network as data, can be constructed by grouping these causes.

The present invention is directed towards extracting a call set-up failure probability and a premature disconnect probability using network data by reading the constructed configuration database and database storing a cause for a premature disconnect (S1).

At step S2, billing data is read from communication network data 23. The communication network data 23 used herein includes information on the time and date of the start and termination of a call, the call originating/destination number, the success/failure of a call, the cause for a disconnect of a call, and information on the duration of a call for all calls originating within the communication network. This information is included mainly in the billing data.

At step S3, whether the read billing record is a normal record is verified. The verification of each billing record is performed by inspecting reference values (maximum, minimum, standard) with respect to all contents in the billing record (time duration of a call, the amount of transmission/reception data, the call originating/destination process class, the call originating/destination address, the call originating/destination switch and port number, logical channel number, the length of a call originating/destination address, the data switch of an originating/destination call (DSE), the service type, the size of a window of a originating/destination call, the start and termination time, and the record type) (S4). If all requirements are met, it is determined that the read billing record is a normal record.

If the read billing record is a normal record, the originating/destination number included in the billing record is compared with a configuration number stored in the configuration database at step S5. If the originating/destination number included in the billing record is equal to a configuration number stored in the configuration database, data is extracted for each configuration database, each originating/destination call, each time and date by using information in the billing record (time and date of the start and termination of a call, the call originating/destination number, the success/failure of a call, causes for a premature disconnection, the time duration of a call, etc.) in order to update the contents of statistics database 24 (S6). Statistics database 24 stores data required for extracting the call set-up failure probability and the premature disconnection probability for each time and date, each originating/destination call with respect to various configurations recorded in configuration database 21. The contents recorded in the statistics database 24 include the number of calls, the number of successfully connected calls which were previously in an abnormal condition and recovered, the time durations for successfully connected calls, and the number of calls whose call set-up failed due to faults from the network.

One record is created for each call, and therefore the number of records is the same as the number of calls. Thus, the number of records is the same as the number of calls originating from or received in the entire communication network, the lower part network, switches, line groups, and lines in the corresponding configuration database. A call whose set-up has failed is a call whose set-up has abnormally failed due to faults in the communication network, and its number is calculated by comparing the database 22 storing a cause for a premature disconnect with a code representative of the cause of a premature disconnect in a record. The number of premature disconnect calls is the number of calls which have been successfully connected but prematurely disconnected later due to faults of the communication network and recovered. The time duration of a call is calculated from time information on the time during which a record is used, and the time and date when a call started and ended.

The call set-up failure probability and the premature disconnect probability are calculated for each time and date, and each originating/destination call with respect to each configuration recorded in the configuration database 21 by using information stored in the statistics database 24 from the following equations:

$$\text{The call set-up failure probability} = \frac{\text{number of call failures}}{\text{number of call attempts}} \quad (1)$$

$$\text{The premature disconnect probability} = \frac{\text{number of premature disconnects}}{\text{time duration per successfully connected call (sec)}} \quad (2)$$

As mentioned before, the present invention seeks to provide a method of extracting quality factors such as a call set-up failure probability and a premature disconnect probability which has been difficult to extract thus far by using billing record data in the data communication network. The method of extracting a call set-up failure probability and a premature disconnect probability in accordance with the present invention has the following advantages:

First, quality values which are accurate and representative of the data communication network can be calculated since the quality values are calculated for all calls created within the data communication network.

Second, quality values can be rapidly calculated since billing data including call characteristics of the data communication network can be used, and thus there is no need to perform a separate test. Also, only one workstation is required for implementing the entire system, and therefore the costs associated with implementing the system are less costly.

Third, it is possible to calculate quality values of a subnetwork, a specific switch, and a specific line as desired by an operator in addition to the quality value of the entire data communication network. Thus, it is easy to locate an area where faults occurred, and to locate local offices/lines. As a result, a high quality information communication service can be provided since the operator can analyze the cause for the quality degradation of a specific area and lines, and can properly solve the problems. Further, the extracted quality values can be reflected into a communication network engineering to enable a stable and efficient communication network to be constructed.

The present invention has been described with reference to a particular embodiment in connection with a particular application. Those having ordinary skill in the art, and access to the teachings of the present invention, will recognize additional modifications and applications within the scope thereof.

It is therefore intended by the appended claims to cover any and all such applications, modifications, and embodiments within the scope of the present invention.

What is claimed is:

1. A method of extracting a call set-up failure probability and a premature disconnect probability which are quality factors necessary for the quality control of a data communication network, comprising the steps of:

constructing a configuration database and a database storing a cause for a premature disconnect;

reading the configuration database and the database storing a cause for a premature disconnect which have been constructed;

reading a billing record from communication network data;

verifying whether the read billing record is a normal record;

determining whether a call originating/destination number of the billing record is equal to a number stored in the configuration database, if it is determined that the read billing record is a normal record;

updating the information content of a statistics database previously constructed for each configuration database, each originating/destination call, and each time and date, if it is determined that a call originating/destination number of the billing record is equal to a number stored in the configuration database; and calculating the call set-up failure probability and the premature disconnect probability from the information content of the statistics database.

2. The method according to claim 1, wherein the configuration database is constructed for a whole communication network, a lower part network, switching offices, line groups, and lines.

3. The method according to claim 1, wherein the configuration database is constructed by using X.121 and E.164 numbering systems which are numbering systems of a packet-switched public data network.

4. The method according to claim 1, wherein information of the statistics database includes the number of calls, the number of call failures, the number of premature disconnects, and the time duration per call.

5. The method according to claim 1, wherein the call set-up failure probability and the premature disconnect probability are calculated from the following equations:

$$\text{The call set-up failure probability} = \frac{\text{number of call failures}}{\text{number of call attempts}}$$

-continued $$\text{The premature disconnect probability} = \frac{\text{number of premature disconnects}}{\text{time duration per successfully connected call}}.$$

6. A method of extracting a call set-up failure probability and a premature disconnect probability which are quality factors necessary for the quality control of a data communication network, comprising the steps of:

constructing a configuration database from which quality values are extracted and a database storing a cause for a premature disconnect which identifies whether a cause for a premature disconnect is from the communication network or from a subscriber;

reading the configuration database and the database storing a cause for a premature disconnect which have been constructed;

reading a billing record from communication network data;

verifying whether the read billing record is a normal record;

returning back to said step of reading a billing record from communication network data if it is determined that the read billing record is not a normal record, and determining whether a call originating/destination number of the billing record is equal to a number stored in the configuration database if it is determined that the read billing record is a normal record;

returning back to said step of reading a billing record from communication network data if it is determined that a call originating/destination number of the billing record is not equal to a number stored in the configuration database, and updating information contents of a statistics database previously constructed for each configuration database, each originating/destination call, and each time and date if it is determined that a call originating/destination number of the billing record is equal to a number stored in the configuration database; and calculating the call set-up failure probability and the premature disconnect probability for each configuration database, each originating/destination call, and each time and date from the information contents of the statistics database.

* * * * *